Figure 1:
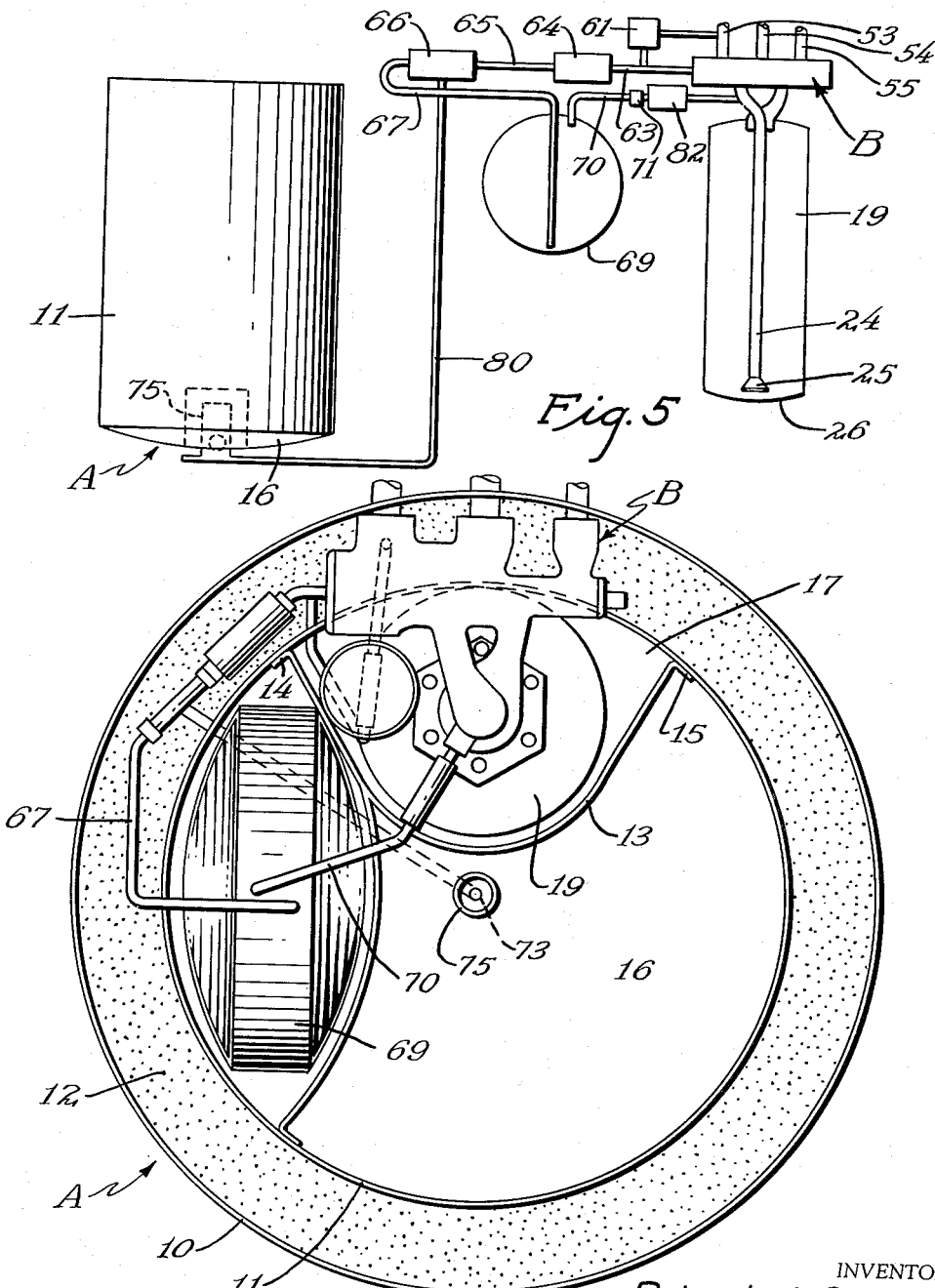

Aug. 22, 1961 R. J. CLEARY 2,997,177
AUTOMATIC WATER SOFTENING DEVICE
Filed March 4, 1954 3 Sheets-Sheet 1

INVENTOR
Robert J. Cleary
BY
ATTORNEY

INVENTOR
Robert J. Cleary
BY Robert M. Dunning
ATTORNEY

United States Patent Office 2,997,177
Patented Aug. 22, 1961

2,997,177
AUTOMATIC WATER SOFTENING DEVICE
Robert J. Cleary, Austin, Minn., assignor to A. R. Wood Manufacturing Company, Luverne, Minn., a corporation of Minnesota
Filed Mar. 4, 1954, Ser. No. 414,025
6 Claims. (Cl. 210—140)

This invention relates to an improvement in automatic water softeners and deals particularly with a device which acts automatically to revitalize the water softening chemical at predetermined intervals.

Water softening units which use zeolite as the water softening chemical are normally rinsed or flushed with brine at suitable intervals to remove the impurities deposited in the zeolite during the water softening process. Various attempts have been made to provide automatic controls which direct the brine to the zeolite at the desired intervals. Most such devices have been costly to build and complicated in character.

It is an object of the present invention to provide an automatic water softener which flushes the zeolite with brine at suitable intervals and which is relatively inexpensive to produce.

A feature of the present invention resides in the provision of a water softening device which includes a tank containing water softening chemical which is enclosed within an outer tank. The outer tank serves as a container for salt or similar revitalizing chemical. Means are provided for automatically producing a stated amount of brine at the lower end of this outer tank which brine is then supplied to the water softening chemical during the revitalizing process.

An important feature of the present invention lies in the provision of a control valve which is capable of controlling a series of fluid passages through the pressure of the fluid itself. The valve is provided with pistons of different areas. The face of the piston of larger area is normally connected with atmospheric pressures so that fluid pressure upon the smaller area piston will hold the valve in one position causing one type of control. However, by communicating this side of the large area piston to fluid pressure, this fluid pressure against the greater area will move the valve in the opposite direction and cause a corresponding control.

A feature of the present invention resides in the provision of a control valve and a water softening system which normally causes a flow of fluid through the water softening tank, including the zeolite or other water softening chemical. However, during the time that the impurities are being removed from the zeolite by the brine, the incoming water is communicated to the valve outlet so that while the flow of soft water is interrupted, hard water continues to be provided.

A further feature of the present invention resides in the provision of the water softening tank which is so arranged that the incoming water to be softened is introduced at the top of the tank above the bed of zeolite and the softened water is removed from a point near the bottom of the tank. However, during the operation of the flushing of the zeolite with brine, the flow of fluid is reversed so that brine enters at the bottom of the tank and works upwardly through the zeolite, thus tending to expand the bed of zeolite and to more thoroughly clean the same.

An added feature of the present invention resides in the provision of a water softening system in which air alone is introduced into the bottom of the tank of zeolite for a period of time preceding the introduction of the brine into the zeolite. This air causes considerable turbulence in the zeolite and acts to expand the bed of material so that the impurities may be more easily removed therefrom.

A further feature of the present invention resides in the provision of an apparatus which acts automatically to measure a predetermined amount of liquid at the termination of each rinsing operation and to conduct this liquid to the bottom of the tank containing salt so that a measured amount of brine will be formed ready for the next revitalizing operation.

A further feature of the present invention resides in the provision of a water softening system which is controlled by means of a single valve. In the particular form of construction illustrated, this valve is electrically operated at time periods and causes automatic cycling of the brine through the bed of zeolite.

These and other objects and novel features of the present invention will be more clearly and fully set forth in the following specification and claims.

Figure 2:
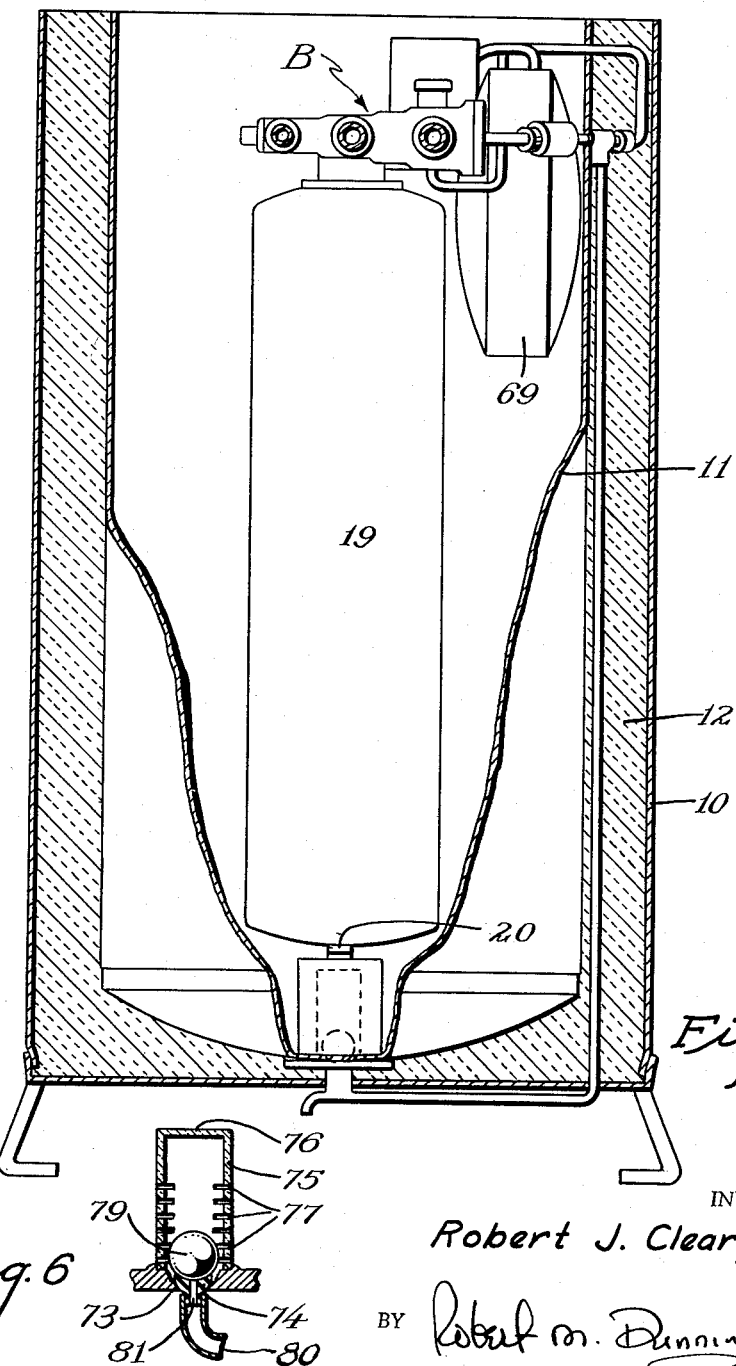
Figure 3:
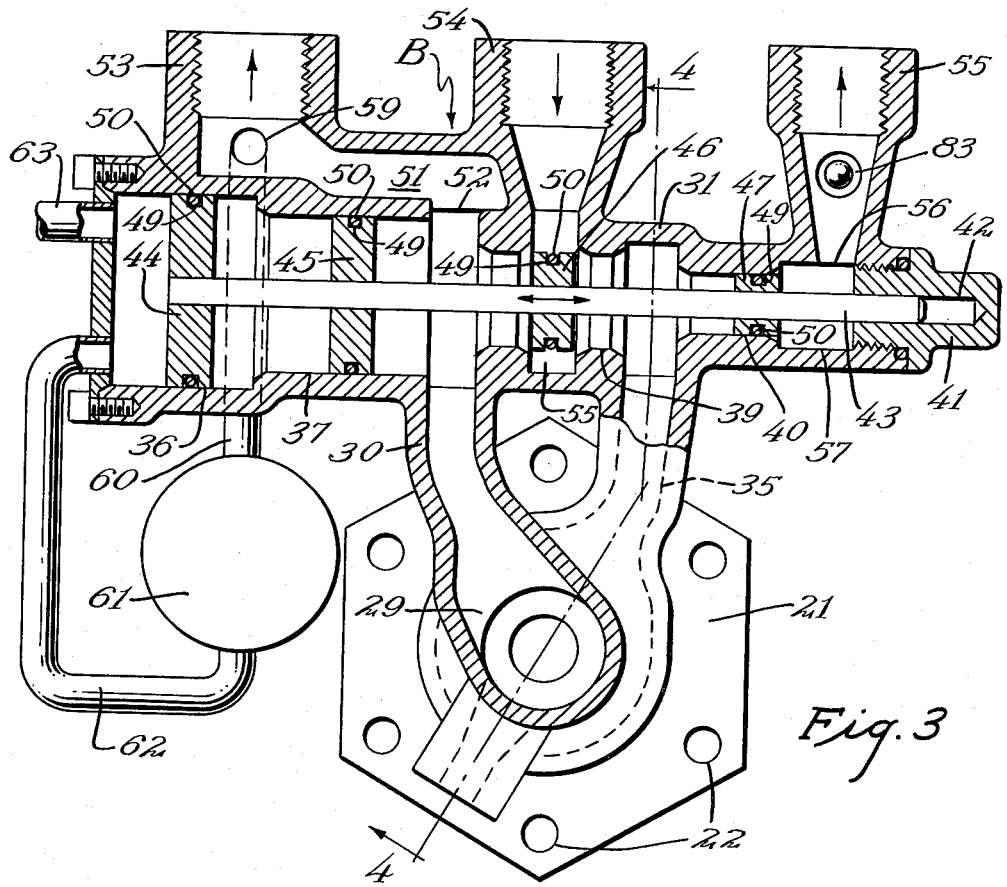
Figure 4:
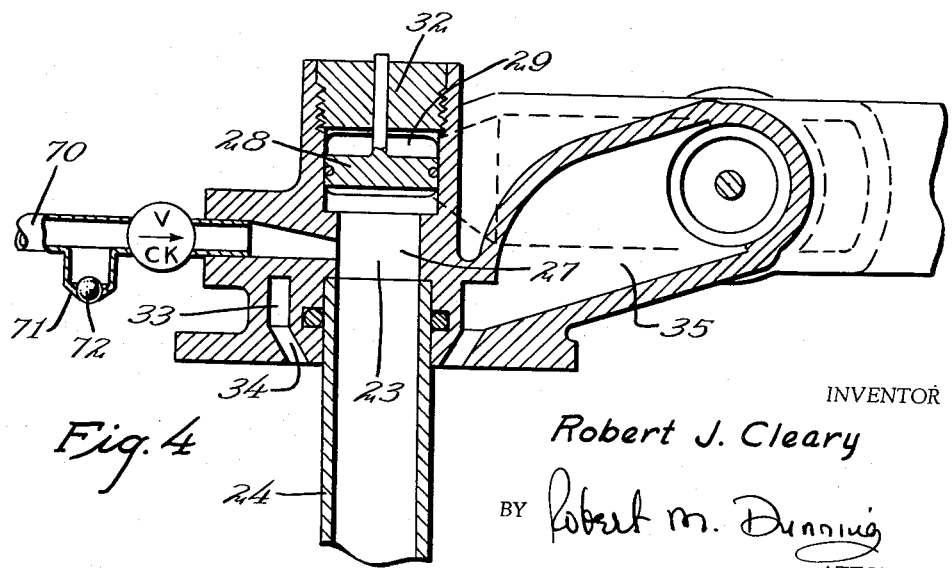

In the drawings forming a part of the specification:
FIGURE 1 is a top plan view of the water softener showing the general construction thereof.
FIGURE 2 is a side elevational view of a portion of the apparatus, a part of the casing being broken away to disclose other parts.
FIGURE 3 is a sectional view through the valve which controls the operation of the system.
FIGURE 4 is a sectional view through a portion of the valve, a position of the section being indicated by the line 4—4 of FIGURE 3.
FIGURE 5 is a diagrammatic view of the system.
FIGURE 6 is a sectional view through a detail portion of the apparatus.

The water softening system is indicated in general by the letter A and is shown as including an outer tank having an outer shell 10, an inner shell, or liner, 11 and insulation 12 between the inner and outer shells. This insulation tends to maintain the water at the temperature at which it enters the system.

A baffle or shield 13 extends inwardly from the inner shell 11 and is provided with marginal flanges 14 and 15 which are secured to the inner surface of the inner shell 11. This baffle 13 is spaced at its lower end from the bottom 16 of the inner shell 11 and is provided with an open top. The baffle 13 forms a compartment 17 which is designed to accommodate the water softening tank or cylinder 19. A baffle 18 also extends around, and protects a smaller metering tank 69 which will be later described.

The tank 19 is supported by any suitable means such as by a bracket 20, a portion of which is indicated beneath the tank 19 in FIGURE 2 of the drawings. The tank 19 is provided at its upper end with a fitting illustrated in detail in FIGURES 3 and 4 of the drawings. This fitting is actually a portion of the casting which includes the valve B also indicated in FIGURES 3 and 4 of the drawings.

The fitting includes a flange plate 21 which is provided with an angularly spaced apertures 22 about its periphery by means of which the plate may be secured to the top of the tank 19. The fitting extends upwardly from the tank and is provided with a central aperture 23 which accommodates the upper extremity of a plastic tubular member 24. As is best illustrated in FIGURE 5 of the drawings, the pipe or tube is provided with a flared screen supporting extremity 25 which terminates above the bottom closure 26 of the tank 19. The aperture 23 is provided with a central portion of restricted diameter indicated in general by the numeral 27. An outlet port 29 communicates with the interior of the aperture 23 above the restricted portion 27. As is clearly indicated, the port 29 communicates with a passage 30 leading to the body 31 of the valve B.

As will be also seen in FIGURE 4 of the drawings, a piston 28 is freely slidable in a vertical direction in the upper portion of the aperture 23. A plug 32 closes the upper end of the aperture above the piston 28. It will be noted that the piston 28 may slide below the level of the port 29, thus acting as a check valve when the pressure is in one direction. Obviously, however, when fluid under pressure is passing upwardly through the tube 24, the piston 28 will slide upwardly, to open the port 29 and permit the fluid to pass into the passage 30.

The fitting at the top of the tank is also provided with an annular manifold which communicates with the interior of the tank through the ring-shaped passage 34. The manifold 33 is connected by a passage 35 leading through the fitting to the body 31 of the valve B. As will be evident from FIGURE 3 of the drawings, the two passages 30 and 35 enter the valve body at longitudinally spaced points thereof.

The valve B is of utmost importance and includes an elongated body indicated in general by the numeral 31, the body being graduated in size. The body 31 includes a large diameter portion 36 at one end thereof which communicates with a slightly smaller diameter portion 37. The center portion is of a slightly smaller diameter as indicated at 39 and this center portion communicates with a still smaller diameter portion 40. The end of the body 31 which is of smallest diameter includes a threaded plug 41 having a central socket 42 designed to accommodate a piston rod 43 forming a part of the valve piston. The socket 42 is merely to serve as a guide for the valve.

The piston rod 43 includes four pistons, each of which are of different outer diameter. A larger diameter piston 44 is provided at one end of the rod and a second piston 45 of somewhat smaller diameter fits snugly within the cylinder portion 37. A still smaller diameter piston 46 fits within the center portion 39 of the cylinder and a still smaller piston 47 is mounted within the smallest diameter portion 40. It is not essential that all of the pistons be of different diameters but this is convenient from a standpoint of machining the cylinder. It is, however, important that the first piston be of different area than the second.

Each of the pistons described are provided with a peripheral groove 49 to accommodate an O-ring 50. Thus, each piston is quite effectively sealed within the portion of the cylinder in which it is located. The passage 30 enters the valve body 31 at the junction between the portion 37 and the center portion 39 and an outlet manifold 51 is provided with a port 52 opposite the passage 30. The outlet manifold 51 communicates with an outlet pipe 53 which is connected to the water system to which the soft water is to be directed.

An inlet connection 54 is connected to a central port 55 which is in the center of the portion 39 of the cylinder. As a result the piston 46 may extend on either side of the inlet port 54. The passage 35 communicates with the portion of the valve body between the center portion 39 and the small diameter portion 40. Accordingly, when the piston 46 is on the left side of center from the position shown in FIGURE 3, the inlet 54 is connected to the passage 35. When the piston 46 is on the right side of center, the inlet 54 can communicate with the outlet manifold 51 and the outlet connection 53.

A drain connection 55 is connected to a port 56 which is to the right of the smaller diameter portion of the cylinder. A piston 47 is so located that it may slide from the small diameter portion to the slightly larger diameter portion 57 to the right thereof, and in this case fluid may flow from the passage 35, through the small diameter cylinder portion, and through the drain connection 55.

A passage 59 leads to a tubular connection 60 through a solenoid valve 61 and through a tubular connection 62 to the left hand side of the piston 44 in the large diameter portion 36 of the valve body. When the valve 61 is opened, outlet pressure may be communicated from the outlet passage to the left hand end of the cylinder. A second tubular connection 63 leads through the flow control device 64 through a tubular connection 65 leading to the inlet of a venturi tube 66, the outlet of which is connected by a tubular connection 67 to a point near the lower extremity of a small metering tank 69. As is indicated in FIGURE 1 of the drawings, this tank 69 is supported within the interior shell 11 at the point near the top thereof by suitable means not illustrated in the drawings. A tubular connection 70 leads from the top of the tank 69 to a point in the small diameter portion 27 of the aperture 23 in the fitting at the top of the tank 19. As is shown in FIGURE 4 of the drawings, the vent 71 is provided in the tubular connection 70, this vent being normally closed by a ball valve 72. However, when the tubular connection 70 is subjected to partial vacuum in a manner which will be later more completely described, the air may enter this vent opening 71.

Within the bottom of the tank which is designed for accommodation of the salt, or extending through the bottom wall 16 of this tank is provided a passage 73 which is encircled by a rubber cup 74. A low tubular enclosure 75 overlies the cup 74, this enclosure having a closed top 76 and having a series of slots or other openings 77 in the lower portion thereof. The upper portion of the enclosure 75 is imperforate for a reason which will be later described. A light weight valve ball which also acts as a float, is enclosed within the enclosure 75 and is held in place thereby. A tubular connection 80 extends from a central passage 81 in the cup 74, through the opening 73 and to the suction connection of the venturi 66. This venturi 66 is so arranged that when fluid under pressure is flowing through the venturi from the passage 65 to the connection 67, fluid will be drawn upwardly in the line 80.

Having described the construction of the water softening system, the operation of the system will be described. During normal operation of the water softening system, the water to be softened will enter through the intake port 54, the piston 46 being to the left of the center position in which it is illustrated. This water is, therefore, in communication with the passage 35 leading to the top of the tank 19. The water thereby is directed into the top of the tank 19 which contains the zeolite or other treating chemical.

The softened water passes upwadly through the tube 24, the flared end 25 being provided with a screen at its lower extremity to prevent the zeolite from being forced upwardly into the tube 24. The water leaving the tank 19 passes through the passage 29 and into the valve chamber, flowing between the pistons 45 and 46 and through the outlet manifold 51 to the outlet connection 53. During this operation the solenoid valve 61 is closed and water under pressure will not flow into the body of the valve to the left of the piston 44. The left hand end of the valve B is connected through the conduit 63, the flow control 64, the connection 65, the venturi 66, and the tubular connection 80, to the bottom of the outside tank which is subject to atmospheric pressure. Accordingly, the fluid pressure of the water leaving the softener acts against the piston 45 to force the entire valve to the left of the position shown in FIGURE 3.

At predetermined intervals, an electrical circuit is closed for a time period desired to the solenoid valve 61. The device providing the closed circuit is not illustrated, but comprises a suitable timer. When the circuit to the solenoid valve 61 is closed, this valve opens and permits fluid under pressure to flow through the connections 60 and 62 to the chamber within the left hand end of the valve body 31. Equal pressure is thus exerted agains opposite sides of the valve, pressure being exerted on the right side of the piston 45 and upon the left side of piston 44. However, as the piston 44 is of larger diameter than the piston 45, the valve will move to the right from the position shown. This action moves the center piston 46 to the right side of the inlet port 54 and moves the piston 47 into the enlarged portion 57 of the cylinder so that fluid can bypass around this piston 47 and to the drain connection 55.

In actual practice, the pressure in the left hand end of the valve is reduced slightly because of the added connection 63. However, the flow control 64 prevents the pressure from dropping sufficiently to keep the valve from movement. Fluid under some pressure passes through the relatively small connections 65 and 67, thereby causing a suction effect to be created in the venturi 26. This suction causes the brine which has previously been formed in the tank 11 to be drawn upwardly through the connection 80, this brine being carried by the fluid into the tank 69. As the brine and water fills the metering tank 69, air flows through the connection 70, and the check valve 82 into the tank fitting portion 27. This air then passes into the interior of the tube 24 which leads to the bottom of the tank 19. The air flows through the screen at the bottom of the tubular member 24 causing bubbles of air to rise upwardly through the zeolite within the tank 19. This not only causes the zeolite to expend and unpack but also agitates so that it may be cleaned more effectively. The passage of the air through the lower end of the tubular member 24 also acts to clean the screen at the bottom of this tubular member. When the brine has all been drawn upwardly through the line 80, the float ball within the enclosure 75 seats upon the rubber cup 74, preventing air from being drawn into the line 80.

When the piston 46 moves to the right from its center position, the inlet 54 is connected through the body of the valve with the outlet manifold 51 and to the outlet connection 53. The pressure in the passage 30 is considerably greater than the pressure of the air which is flowing through the tube 24 and, accordingly, the piston 28 drops and acts as a check valve to prevent incoming water from flowing downwardly in the tubular member 24.

The air which has been carried into the tank 19 leaves through the passage 35 and is bypassed around the piston 47 to the drain connection 55. The flow of air continues until the tank 69 is filled with liquid.

When the tank 69 becomes filled with brine, the brine is forced through the passage 70 and the check valve to the aperture 23 in the fitting at the top of the tank 19. Accordingly, the brine flows downwardly through the tubular member 24 and out through the screened bottom of this member. The brine is forced upwardly through the zeolite freeing the zeolite of the impurities which are deposited therein. After all the brine has been drawn from the bottom of the tank 11, the inlet to the line 80 is closed, but water continues to flow through the zeolite until it is completely rinsed. This water comes from the water supply line, through connections 60 and 62, the chamber at the left end of the valve chamber, the connection 63, the flow control 64, connections 65, venturi 66, and connection 67. The liquid continues through the metering tank 69, connection 70 and check valve 82, entering the tube 24, leading to the bottom of tank 19. The water which flows from the tank 19 passes through the manifold 33 and passage 35, then flowing through the body 31 of the valve B and to the drain opening 55.

At the completion of the revitalizing operation and after a suitable period of time, the solenoid valve 61 is closed. When the valve 61 is closed, the pressure to the left of the piston 45 within the valve body 31 is reduced, being no longer connected to the water supply, and being connected to line 80 through which liquid may drain. This causes an unbalanced pressure on the right of piston 45, moving this piston to the left to its starting position. This movement of the piston valve reestablishes the connection from the intake port and the passage 35 leading to the top of the tank 19. Water then flows through the passage 35 and manifold 33 and circulates downwardly through the zeolite to be softened thereby. The softened water passes upwardly through the central tube 24, through the passage 30, the outlet manifold 51, and to the outlet connection 53. As the line 80 is no longer subjected to partial vacuum, the liquid within the tubular members connected to the venturi start to drain down the connection 80. This causes a siphon effect upon the full tank 69 and the metering tank 69 is siphoned into the bottom of the salt containing tank 11. During this operation, the air vent 71 opens to permit air to flow into the tank 69.

Thus, it will be seen that the metering tank 69 serves the double purpose of supplying a certain amount of air to the bottom of the bed of zeolite so as to agitate the same prior to the introduction of brine, but also acts to provide a measured amount of water at the base of the salt containing tank. As a result a predetermined quantity of brine is formed. The brine in the bottom of the tank 11 causes the ball 79 to float into the top of the enclosure, and as a result this ball is relatively unaffected by the corrosive action of the brine as the top part of the enclosure always includes a small amount of water only.

It is important to note that during the cycle of operation, all parts of the system which have been subjected to brine are rinsed by fresh water. After the brine has all been drawn upwardly through line 80, fresh water flows through this line, through the metering tank, the zeolite tank, and the valve B, rinsing the associated lines and parts. When the solenoid valve is closed, fresh water flows from the metering tank, the venturi, and line 80, rinsing brine from these elements.

While the system has been described as particularly useful with a water softening system including zeolite, the same system may be used with other softening chemical or for other liquid treating chemicals. For example, the system may be used to neutralize acid waters, to remove iron, or to remove sulphur. In the latter arrangement, potassium permanganate treaded sand is substituted for the zeolite, and this sand is renewed at intervals by flushing with a potassium permanganate solution.

As the drain opening 55 is usually connected to a drain pipe which becomes filled with water at the end of the rinsing process, an air vent 83 is provided connected to this opening 55. When the piston valve returns to normal position at the conclusion of the rinsing operation, this vent may admit air to prevent siphoning effect to create partial vacuum at the opening 55.

It is believed novel to provide a water softener in which water enters the top of a chemical containing tank above a bed of zeolite and in which the softened water leaves the bottom of this tank through a screened, or porous filtered, port. This is of utmost importance, as the usual system fails to take advantage of the lowermost portion of the zeolite and as the brine normally fails to properly flush this portion of the chemical. It should be noted that, by withdrawing softened water from within about a quarter of an inch from the tank bottom, all of the zeolite is subjected to the water, and also to the brine upon reverse circulation during the flushing operation.

In accordance with the patent statutes, I have described the principles of construction and operation of my water softening device and while I have endeavored to set forth the best embodiment thereof, I desire to have it understood that abvious changes may be made within the scope of the following claims without departing from the spirit of my invention.

I claim:
1. In a water softening system, a hard water inlet, a soft water outlet and a drain; a water softening tank adapted to contain a deep bed of ion exchange water softening material, a water metering and air storage tank and a salt storage tank; conduit means connecting said hard water inlet with the top of said water softening tank for introducing hard water to the top of said tank during the water softening cycle and conduit means connecting the bottom of the water softening tank with the soft water outlet for withdrawing soft water from the bottom of said tank during the water softening cycle; conduit means connecting the hard water inlet, the metering tank and the bottom of the water softening tank for introducing hard water to the bottom of the water softening tank during the regenerating cycle; an aspirator in said conduit between the hard water inlet and the metering tank connected to the bottom of the salt storage tank for introducing brine into the system; conduit means connecting the top of said water softening tank with the drain for discharging brine and flushing water from said tank during the regenerating cycle; and valves in said conduits for diverting the flow of water through said system to the water softening cycle and the regenerating cycle.

2. In a water softening system, a hard water inlet, a soft water outlet and a drain; a water softening tank having an inlet and an outlet and adapted to contain a deep bed of ion exchange water softening material, a closed water metering and air storage tank and an open salt storage tank, said metering tank being disposed above said salt storage tank; conduit means connecting said hard water inlet to the inlet of said water softening tank for introducing hard water into said tank during the water softening cycle and conduit means connecting the outlet of the water softening tank with the soft water outlet for withdrawing soft water from said tank during the water softening cycle; conduit means connecting the hard water inlet with the bottom of said closed metering tank and conduit means connecting the top of said metering tank with the outlet of the water softening tank for introducing hard water to the outlet of the water softening tank during the regenerating cycle; an aspirator in said conduit between the hard water inlet and the metering tank connected to the bottom of the salt storage tank for introducing brine into the system during the regenerating system; conduit means connecting the inlet of said water softening tank with the drain for discharging brine and flushing water from said tank during the regenerating cycle; an air check valve adjacent the top of the metering tank for admitting air into said tank at the end of the regenerating cycle; and valves in said conduits for diverting the flow of water through said system to the water softening cycle and the regenerating cycle.

3. In a water softening system, a hard water inlet, a soft water outlet and a drain; an upright elongated water softening tank, a closed metering and air storage tank and an open salt storage tank disposed below said metering tank; a multiple port, two-position, hydraulic piston control valve; conduit means connecting the ports of said valve with the hard water inlet, the soft water outlet, top and bottom of said water softening tank and said drain; by-pass conduit means connecting the soft water outlet thru a hydraulic pressure chamber in one end of the valve and through the metering tank to the bottom of the softening tank; means in said valve for channeling hard water from said hard water inlet through said valve to the top of said water softening tank when the valve is in its first position; means in said valve for channeling soft water from the bottom of the water softening tank through said valve to the soft water outlet; means in said valve for channeling hard water from the hard water inlet through said valve to the soft water outlet and through the hydraulic pressure chamber and the metering tank to the bottom of the water softening tank when the valve is in its other position; an aspirator in said bypass conduit between the valve pressure chamber and the metering tank connected to the bottom of the salt storage tank; means in said valve for channeling fluids from the top of said water softening tank through said valve to said drain; a check valve in the conduit means between the bottom of the softening tank and the hydraulic control valve; a second check valve in the conduit means between the metering tank and the bottom of the softening tank; an air bleeder valve in the conduit means between the metering tank and the second check valve; said valve channeling means comprising a rod and a plurality of coaxial constantly spaced-apart pistons on said rod, said pistons having different areas whereby the position of said pistons is changed by differential hydraulic pressure upon said pistons, the largest of said pistons movable in said hydraulic pressure chamber; and timer controlled electrically operated solenoid valve means in said by-pass conduit for introducing water into said hydraulic pressure chamber for changing said differential pressures and piston positions for diverting the flow of water through said system to the water softening cycle and the regenerating cycle.

4. In a water softening system, a hard water inlet, a soft water outlet and a drain; a water softening tank adapted to contain a deep bed of ion exchange water softening material, a water metering and air storage tank and a brine tank; and automatically controlled multi-chambered valve; conduit means connecting said hard water inlet through said valve to the top of said water softening tank for the introducing hard water to the top of said tank during the water softening cycle and conduit means connecting the bottom of the water softening tank through said valve with the soft water outlet for the withdrawing soft water from the bottom of said tank during the water softening cycle; conduit means connecting the hard water inlet through said valve to and through the metering tank to the bottom of the water softening tank for introducing hard water to the water softening tank during the regenerating cycle; an aspirator in said conduit between the hard water inlet and the metering tank connected to the bottom of the brine tank for introducing brine into the system; conduit means connecting the top of said water softening tank through said valve with the drain for discharging brine and flushing water from said tank during the regenerating cycle; said valve containing a rod in said chambers and a plurality of spaced apart pistons on said rod, said pistons having different areas whereby the position of said pistons is changed by differential pressure upon said pistons and automatic electrically operated solenoid valve means for changing said differential pressures and piston positions for diverting the flow of water through said system to the water softening cycle and the regenerating cycle.

5. In a water softening system, a hard water inlet, a soft water outlet and a drain, a water softening tank adapted to contain a deep bed of ion exchange water softening material, a closed water metering and air storage tank and an open brine tank, said metering tank being disposed above said brine tank; an automatically controlled multi-chambered valve; conduit means connecting said hard water inlet through said valve with the top of said water softening tank for introducing hard water to the top of said tank during the water softening cycle; conduit means connecting the bottom of the water softening tank through said valve with the soft water outlet for withdrawing soft water from the bottom of said tank during the water softening cycle; conduit means connecting the hard water inlet through said valve with the bottom of said metering tank and conduit means connecting the top of said metering tank with the bottom of the water softening tank for introducing hard water to the bottom of the water softening tank during the regenerating cycle; an aspirator in said conduit between the hard water inlet and the metering tank connected to the bottom of the brine tank for introducing brine into the system during the regenerating system; conduit means connecting the top of said water softening tank through said valve with the drain for discharging brine and flushing water from said tank during the regenerating cycle; an air check valve adjacent the top of the metering tank for admitting air into said tank at the end of the regenerating cycle; said automatically controlled multi-chambered valve having a rod in said chambers and a plurality of spaced apart pistons on said rod, said pistons having different areas whereby the position of said pistons is changed by differential pressure upon said pistons; and automatic clock controlled electrically operated solenoid valve means for changing said differential pressures and piston positions for diverting the flow of water through said system to the water softening cycle and the regenerating cycle.

6. In a water softening system, a hard water inlet, a soft water outlet and a drain; an upright elongated water softening tank, a closed metering and air storage tank and an open brine tank disposed below said metering tank; an automatically controlled multi-chambered valve on said water softening tank; conduit means connecting said hard water inlet through said valve with the top of said water softening tank; conduit means connecting the bottom of the water softening tank through said valve with the soft water outlet; conduit means connecting the hard water inlet through said valve with the bottom of the metering tank and valved conduit means connecting the top of the metering tank with the bottom of the water softening tank; an aspirator in said conduit between the hard water inlet and the metering tank connected to the bottom of the brine tank; conduit means connecting the top of said water softening tank through said valve with said drain; said automatically controlled multi-chambered valve having a rod in said chambers and a plurality of spaced apart pistons on said rod, said pistons having different areas whereby the position of said pistons is changed by differential pressure upon said pistons; and automatic clock controlled electrically operated solenoid valve means for changing said differential pressures and piston positions for diverting the flow of water through said system to the water softening cycle and the regenerating cycle.

References Cited in the file of this patent

UNITED STATES PATENTS

| | | |
|---|---|---|
| Re. 18,970 | Friend | Oct. 17, 1933 |
| 614,594 | Williamson | Nov. 22, 1898 |
| 1,051,768 | Rumold | Jan. 28, 1913 |
| 1,272,052 | Kennicott | July 9, 1918 |
| 1,354,604 | Duggan | Oct. 5, 1920 |
| 1,677,891 | Green | July 24, 1928 |
| 1,737,202 | Runnels | Nov. 26, 1929 |
| 1,749,622 | Yoont | Mar. 4, 1930 |
| 1,976,439 | Dotterweich | Oct. 9, 1934 |
| 2,065,962 | Bowers | Dec. 29, 1936 |
| 2,304,661 | Shoemaker | Dec. 8, 1942 |
| 2,351,648 | Whitlock | June 20, 1944 |
| 2,620,299 | Deters et al. | Dec. 2, 1952 |
| 2,641,281 | Phillips | June 9, 1953 |
| 2,670,328 | Webb | Feb. 23, 1954 |
| 2,672,887 | Tipton | Mar. 23, 1954 |